HIGH SPEED PRINTER WITH MAGNETOSTRICTIVE IMPRESSION MEMBERS

Filed Sept. 28, 1961 3 Sheets-Sheet 1

INVENTOR
MAX PREISINGER
BY John S. Gasper
ATTORNEY

Oct. 6, 1964 M. PREISINGER 3,151,543

HIGH SPEED PRINTER WITH MAGNETOSTRICTIVE IMPRESSION MEMBERS

Filed Sept. 28, 1961 3 Sheets-Sheet 2

Oct. 6, 1964 M. PREISINGER 3,151,543

HIGH SPEED PRINTER WITH MAGNETOSTRICTIVE IMPRESSION MEMBERS

Filed Sept. 28, 1961 3 Sheets-Sheet 3

United States Patent Office 3,151,543

Patented Oct. 6, 1964

3,151,543

HIGH SPEED PRINTER WITH MAGNETOSTRICTIVE IMPRESSION MEMBERS

Max Preisinger, Darmsheim, Kreis Boblingen, Wurttemberg, Germany, assignor to International Business Machines Corporation, New York, N.Y., a corporation of New York Filed Sept. 28, 1961, Ser. No. 141,443
Claims priority, application Germany Oct. 3, 1960
6 Claims. (Cl. 101—93)

Figure 1:
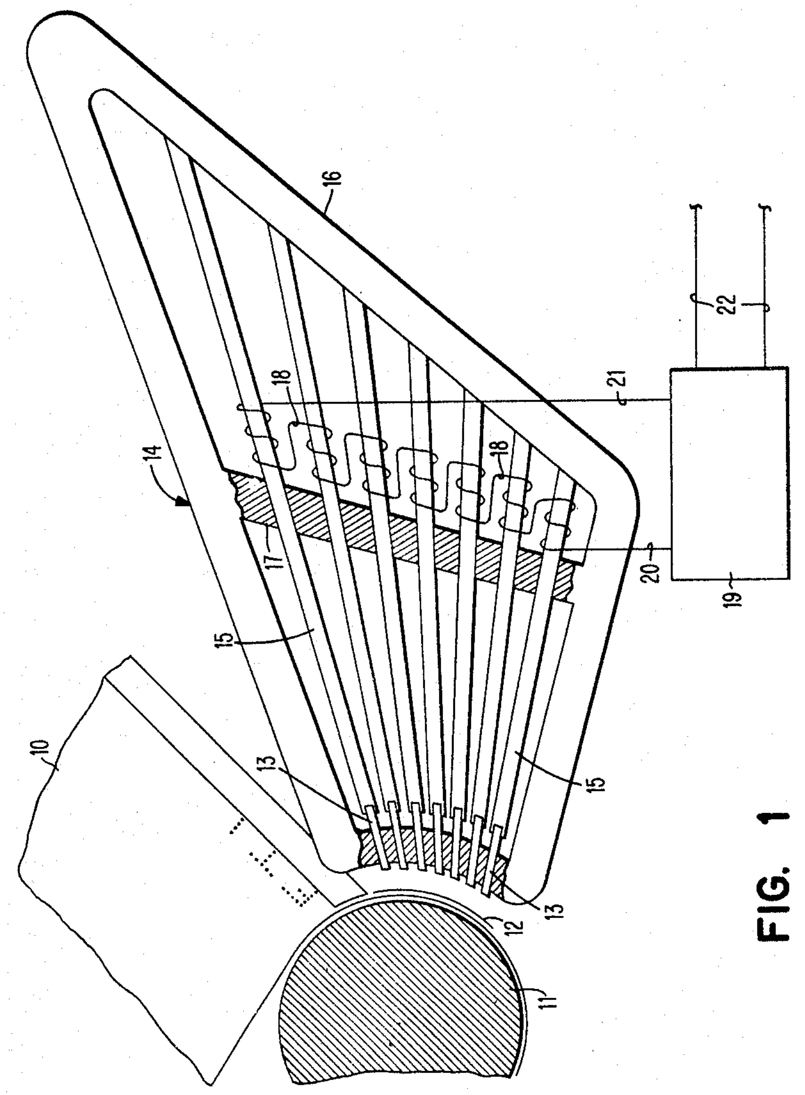

This invention relates to a printing apparatus and particularly to a high speed printing apparatus wherein printed data impressions are made in the form of a mosaic pattern of dots or the like.

One form of mosaic printer apparatus is the so-called wire printer. In my U.S. copending patent application for a high speed printer, Serial No. 57,251, filed September 20, 1960, now Patent No. 3,108,534, issued October 29, 1963 there is described and claimed a mosaic printer of the wire type having a print mechanism comprising a plurality of print elements, i.e., wires, independently operable for printing data on a print medium in the form of a dot pattern. Each of the print elements is excited into mechanical vibrations for performing the actual printing process. Said mechanical vibrations are produced by means of an electric alternating current which through suitable windings on the print elements excites the individual printing elements into mechanical vibrations which correspond to the inherent frequency of such elements as accurately as possible. In the aforementioned patent application, each excitable print element is provided with its own winding and is adapted to be independently excitable by suitable means such as a controllable power amplifier. Where each winding is energized by a separate amplifier, a relatively high expense in technical equipment may be encountered.

It is an object of the present invention to provide an improved printer apparatus of the type shown in my copending patent application.

It is an object of the present invention to provide such an improved printer apparatus having a simplified control therefor.

It is a further object to provide such a printer in which high speed is not sacrificed.

It is a still further object to provide an improved high speed mosaic printer in which the noise level is low and human comfort is served.

In accordance with the practice of the present invention, the above objects and other objects and advantages are obtained by providing that each print element have a particular inherent frequency at which it will operate to form an imprint on a print medium. It is further provided that each print element be controllable by a suitable excitation frequency commonly applied to a plurality of or all of the different print elements.

According to another aspect of the present invention, the printing elements may, at successive times, be controlled individually by respectively applying one single frequency or the printing elements may be controlled in groups by applying a frequency spectrum containing the inherent frequencies of the printing elements to be respectively excited simultaneously. In both cases all printing elements are permanently connected to a common amplifier supplying the excitation energy. The selection of the respectively desired printing elements is affected by applying one or several frequencies to the amplifier input. In an arrangement for carrying out the present invention wherein the printing elements which are controlled only singly and individually are for the row by row and column by column representation of the characters arranged along a straight line.

It is another feature of this invention that the electric energy required for controlling the individual print elements is simultaneously applied through a common amplifier to all printing elements and that in series with the amplifier there are connected frequency generators which are tuned to the frequencies required for the selection of the individual elements which may be controlled individually. In a further embodiment, in accordance with this invention, it is also possible to connect in series with the amplifier a single frequency generator which is able to vibrate with a plurality of frequencies and which may be selectively controlled for respectively reproducing one or several of the required frequencies. Moreover, the required frequencies may also be separated by a filter out of an available frequency spectrum and applied to the connected units.

A special advantage associated with the present invention consists in the fact that characters or curves serving as original patterns for producing the frequencies required for exciting the individual printing elements may be scanned dot by dot and the scanning signals control the application of a frequency to the printing elements, the value of which is dependent on the distance of the respectively scanned dot from a reference line. In a particularly advantageous embodiment of the invention, the characters or curves serving as original patterns are scanned by means of so-called flying spot tube, the light spot of which is moved in a manner of a television master. An especially simple technique for use in connection with the present invention provides that the light spot is moved up and down along a vertical or almost vertical line and the record carrier to be scanned simultaneously performs a movement transversely to such line in synchronism with the movement of the record carrier to be printed. It is advisable that the value of the frequency which increases and decreases again during an up and down movement of the light spot be a function of the distance of the light spot from its bottom point of reversal. The inherent frequencies of the individual printing elements are so selected and in all cases that printing element is controlled which lies on the respective level of the light spot. Thus, e.g., if the letter "E" is scanned by the described technique in a manner well known in the art of reading devices for the blind, there is first produced a vibration of an increasing and decreasing frequency indicating that the light spot moves up and down on a straight line. When scanning the three horizontal line elements of the letter "E" there are separated from the increasing and decreasing frequency a short vibration each of a low, medium, and high frequency respectively. In the aforementioned reading device for the blind, those frequencies are rendered audible and enable a proper recognition of the character scanned. According to the method of this invention, frequencies obtained in the scanning of the characters are used for controlling the individual printing elements. The increasing and decreasing frequency sensed by the scanning signals may, e.g., be produced by the frequency of which is changed cyclically and in synchronism with the movement of the scanning spot. However, it is also possible to provide a number of constantly vibrating oscillators corresponding to the number of printing elements which oscillators are tuned to the resonant frequencies of the individual printing elements and are through a commutator rotating in synchronism with the movement of the scanning spot alternately connected to a switch which is actuated by the scanning signals and which in accordance with the presence or absence of a character element transfers the respective frequencies to a power amplifier to the printing element. Scanning may, of course, also be effected by other means known in the television art or in the case of magnetic records by means of magnetic heads.

According to another aspect of the present invention, it is proposed to separate the frequency bursts available for exciting the individual printing elements by filters and to enter them column by column or row by row into a storage matrix, the individual storage locations of which are well known, interconnected by logic circuits for recognizing the scanned characters particularly the digits. In this manner it is possible not only to produce a scanned original, for example a document, but also to store the numerical values contained therein and to utilize them in arithmetic processes.

The foregoing and other objects, features and advantages of the invention will be apparent from the following more particular description of preferred embodiments of the invention, as illustrated in the accompanying drawings.

In the drawings:

FIG. 1 is a perspective view of a printer mechanism incorporating the principles of the present invention.

Figure 2:
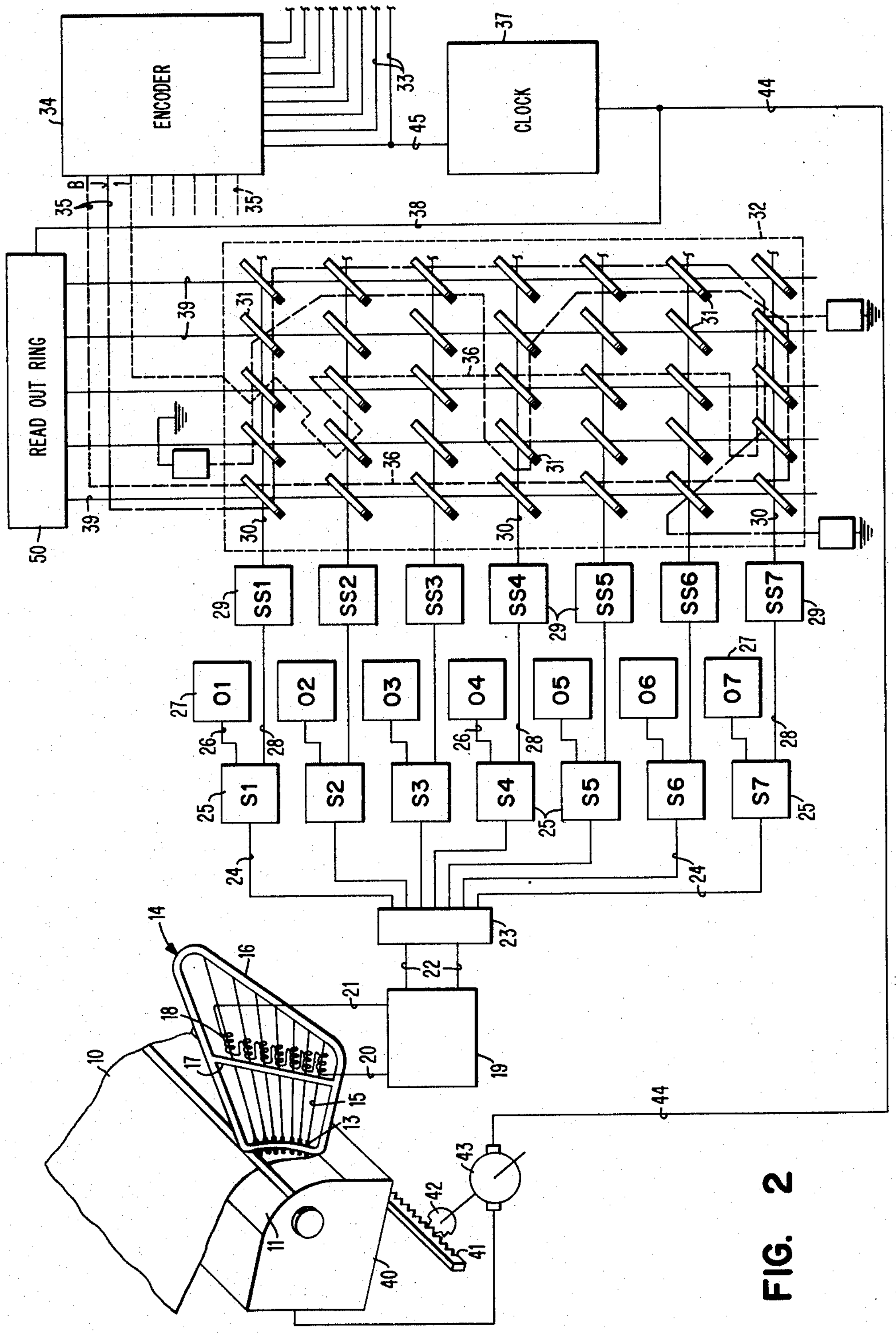

FIG. 2 schematically represents a circuit for controlling the print mechanism of FIG. 1 in accordance with a first embodiment of the present invention.

Figure 3:
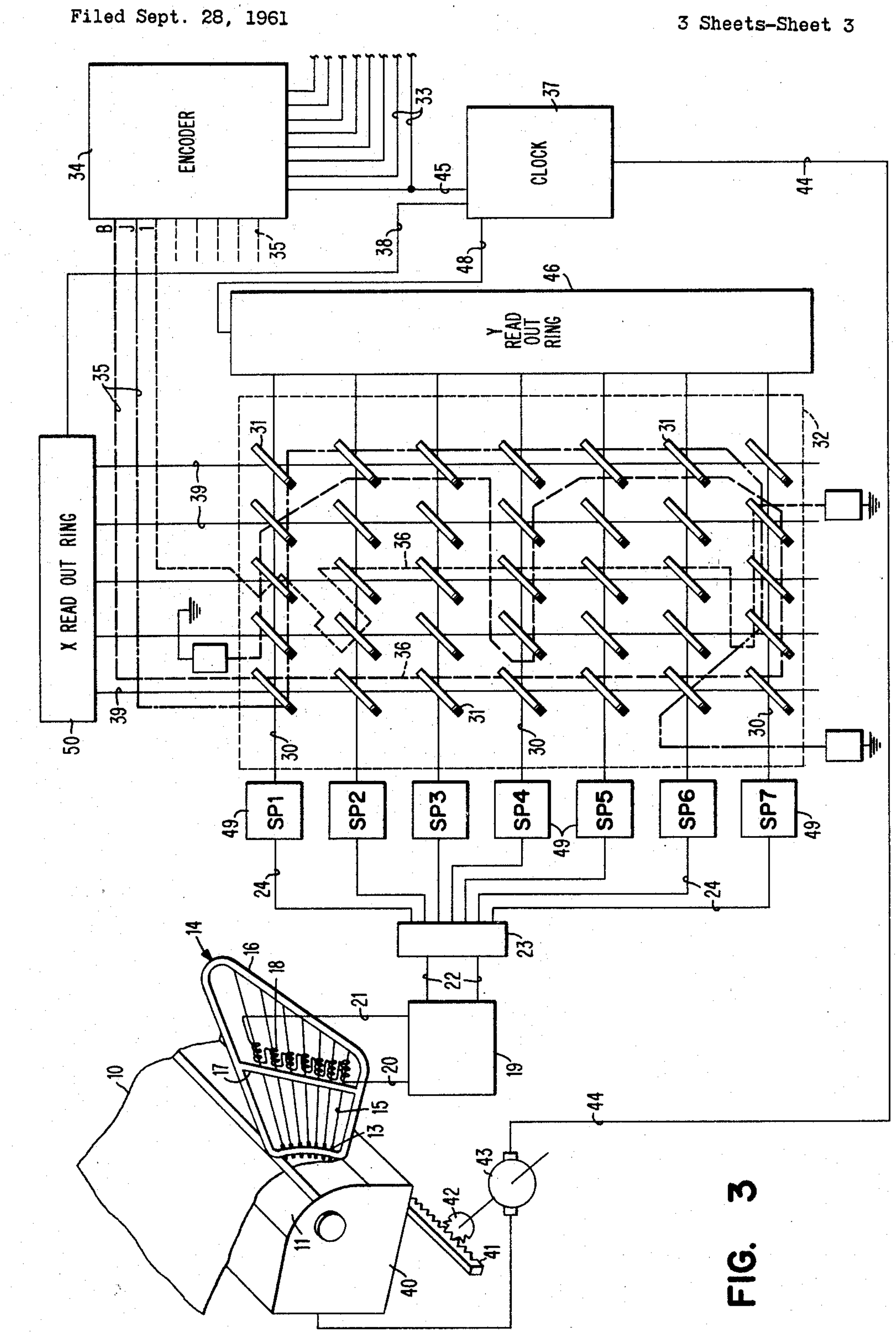

FIG. 3 schematically illustrates a second embodiment of an electric circuit arrangement for controlling the print mechanism of FIG. 1.

Referring to the drawings, a print medium such as paper 10 is fed in the usual manner (by means not shown) preferably a line at a time over a platen 11 of any well-known type. An ink ribbon 12 or the like is interposed between the paper 10 and the ends of a plurality of print stylii 13, the ends of which are brought to bear against the ink ribbon 12 and which when oscillated effects the production of a mosaic pattern in the form of data to be reproduced on paper 10.

In one version of this invention the print stylii 13 of the print mechanism are arranged in a row within openings in the front end of the print mechanism support block 14. Each of the print stylii 13 is connected to a vibrator 15 such as a rod or tube or the like made of magnetostrictive material. Each of these vibrators 15 is magnetically coupled at the ends remote from the stylii 13 to a yoke 16 of magnetic material in support block 14. Intermediate their stylus and yoke ends, the vibrators 15 are supported in common at their nodal points by a crosspiece 17. Coils 18 are wound on each of the vibrators 15 in a suitable manner to provide the energization which produces magnetostrictive vibrations therein. While various magnetostrictive materials may be used to form the vibrator 15, a suitable magnetostrictive material is shown in my copending application, Serial No. 57,251, filed September 20, 1960. More specifically, as disclosed in said copending application, the magnetostrictive material may preferably be the alloy comprising forty nine (49) parts of iron, forty nine (49) parts of cesium and two (2) parts of vanadium commonly known under the trade names of "Vacoflux" or "Permendur."

In accordance with this invention, each of the vibrators 15 is designed to be magnetostrictively oscillatable at a different inherent frequency. In a preferred embodiment this is attained as shown schematically in the drawings by providing that the vibrators 15 have different lengths. Each of the vibrators 15, however, may be made of the same material and have equal cross sections. Because of the difference in length, therefore, each of the vibrators 15 has an inherent frequency which is different and distinct from that of the other vibrators in the group with which it is combined to print a matrix or mosaic of dots. Where the lengths of the vibrators 15 differ, of course, each must be supported at a different nodal point by the crosspiece 17. This aspect is shown by illustrating the crosspiece 17 as slanted and the yoke 16 is similarly slanted to accommodate the various lengths of the vibrators 15.

Various other techniques will occur to persons skilled in the art which can be used in obtaining the mechanical design which will produce vibrators 15 having different inherent frequencies. For example, all of the vibrators 15 could conveniently be of uniform length but having different mass. An additional consideration for designing the print mechanism of the present invention to obtain the frequency distinctions for the various vibrators 15 is that the individual resonant frequencies be selected so that any cross talk from one vibrator 15 to another or the excitation of one vibrator 15 by the resonant frequency of another be rendered impossible. By way of an example, where seven vibrators are used for printing characters in a 5 x 7 matrix, the design of the vibrators 15 might conveniently be arranged so that their respective inherent frequencies are 17, 17.5, 18, 18.5 19, 19.5, and 20 kc. per second.

In accordance with this invention, since each of the vibrators 15 is oscillatable at a different inherent frequency, the winding 18 may be connected in series circuit connected by leads 20 and 21 to the output of a power amplifier 19.

The means for controlling the energization of the vibrators 15 through amplifier 19 may be seen more clearly by reference to FIG. 2. In the embodiment of FIG. 2, a control means for printing characters from a 5 x 7 matrix is illustrated. As shown therein, amplifier 19 has its input connected by leads 22 to a decoupling circuit 23. The decoupling circuit 23 has inputs connected by leads 24 to a plurality of switches 25 ($S_1$–$S_7$). Each of the switches 25 has a first input connected by leads 26 to a frequency generator such as oscillators 27 ($O_1$–$O_7$). Each of the oscillators 27 may be the free running type and is tuned to the frequency of a particular vibrator 15. A second input from each of the switches 25 is connected by leads 28 to a corresponding single shot 29. Each of the inputs of the single shots 29 are each connected to an output winding 30 of a separate row of cores 31 in a single plane magnetic core memory device 32.

Characters are supplied by an output device such as a computer (not shown) in a form of electric pulses through leads 33 to an encoder 34 under control of clock mechanism 37, having a first output connected by lead 45 to an input with leads 33 of encoder 34. The input pulses are converted in encoder 34 and read through lines 35 into the magnetic core storage device 32. The encoder 34 has a number of outputs 35 corresponding to the number of characters to be processed. Each of these outputs is assigned to a specific character. The outputs are connected through lines 35 to the memory 32. The individual lines 35 are respectively connected to a write conductor 36 which is threaded in the shape of the corresponding character through the proper cores 31 of the core storage memory 32. When a pulse occurs on one of the lines 35, the character corresponding to that line is represented as a planar pattern formed by the cores 31 that have been written into. For the purpose of illustration, in FIG. 2 the patterns formed by the write conductors 36 are in the form of the character B as shown in the dashed lines. A numeral "1" is shown in the dotted lines and the character J is shown in dot and dash lines. In order to simplify the illustration the patterns formed by the write conductors for the remaining characters which may be employed in practicing the present invention have not been shown. A suitable circuit for use as an encoder to practice the present invention is described in U.S. Patent 2,771,599—Nolde et al. A suitable clock circuit is shown in U.S. Patent 2,534,232—Cleeton. Other encoder circuits may be used as described in Automatic Digital Calculators, pages 28 and 115, Booth and Booth, 2nd Edition; Digital Computer Components and Circuits, page 57, R. K. Richards and D. VanNostrand, 1958. For a clock mechanism, a suitable circuit might be a free-runing multivibrator (Eccles-Jordan Circuit, Flip-Flop) at the output of which pulses occur at regular intervals. Such circuits preferably are pulse generators that are quartz stabilized.

The characters are read out of the core storage matrix 32 by a readout device such as an Overbeck ring 50 under control of a clock mechanism 37 to which it is connected by lead 38. Ring 50 is preferably a circuit as described in U.S. Patent 2,404,918—Overbeck, or may be the circuit described in U.S. Patent 2,534,232—Cleeton. Each of the read conductors 39 may be connected to an individual stage of the readout ring 50. As shown in FIG. 2 the print medium 10 and platen 11 are mounted on a movable carriage mechanism 40. Any suitable means for effecting motion of the carriage 40 may be employed and for illustrative purposes might be a rack 41 driven by a pinion gear 42 mechanically connected to an electric motor 43, which is connected by lead 44 to a second output of clock 37. The movement of the print carriage is controlled by clock 37 in such a manner that a character contained in memory 31 is read out column by column in synchronism with the read out of the characters from storage 32 through the single shot multivibrators 29, the switches 25, the decoupling circuit 23, the power amplifier 19, and the print vibrators 15 column by column to the paper 10. The single shots 29 increase the duration of the electric pulses supplied by the core 31 to a period suitable for the printing operation which, depending on the desired printing intensity, may extend in the range of 200 microseconds to one millisecond. During this time the switches 25 required for representing the respective character column are operated by potentials occurring at the outputs of the single shot multivibrators 29 so that the respective oscillators 27 may be connected through the decoupling circuit 23 to the input of the amplifier 19. The frequency spectrum occurring at the output of amplifier 19 which contains the frequencies corresponding to the set cores 31 included in the respective column to be considered excites the vibrators 15 which are tuned to these inherent frequencies. The vibrators 15 thus are longitudially oscillated at their inherent frequencies so that the print pins 13 radiating toward the plane of paper 10 press the ink ribbon 12 against the paper 10 and in this manner effect the imprint of the respective column of the character to be printed. After the first column is printed, the next column of memory 32 under control of clock 37 is read out by the second stage of the readout ring 50. At the same time the print carriage 40 under the control of the clock 37 is advanced one column by motor 43 so that the next column of the character is moved into the range of the printing pins 13. In the specific embodiment a character comprises a maximum of five columns and seven rows, the amplifier 19 is therefore adapted for simultaneously exciting seven vibrators if called for by the character contained in the memory storage 32.

In the embodiment shown in FIG. 3, only one printing pin 13 is actuated at any one time, so that for representing a column of a character in which more than one dot is to be formed in a column on the print medium 10, the individual printing pins 13 are to be energized and operated in succession. For this purpose there is provided an additional readout ring 46 which performs seven cycles of operation for each cycle of ring 50. Thus, during readout time of a column the magnetic cores 31 belonging to the rows 1 to 7 are read out at successive times. While the printer of FIG. 3 may inherently have a slower operating speed due to the greater time required for reading the information out of storage, this disadvantage is compensated for by the advantage that the amplifier 19 may be a more simple type since it would operate to control the energization of one vibrator 15 at a time. In FIG. 3, the frequency generators, switches, and pulse lengthening elements are illustrated by elements 49 connected to read windings 30 of cores 31.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a printing apparatus having means forming a print couple comprising a print medium and a marking medium, the combination comprising printing means operable on said print couple for producing a mosaic pattern on said print medium including a plurality of magnetostrictively excitable impression making members, said impression making members being individually magnetostrictively excitable at different inherent frequencies, and means for selectively energizing said magnetostrictively excitable impression making members at their different inherent frequencies in accordance with the data pattern to be reproduced including winding members on each of said impression making members, said winding members being interconnected to form a single series circuit, amplifier means having an output to said series circuit, and means for applying a spectrum of predetermined energizing frequencies to said amplifier means in a predetermined pattern indicative of data to be reproduced on said print medium.

2. In a printing apparatus, the combination in accordance with claim 1 in which said individual energizing frequencies of said spectrum are applied serially to said series circuit of said winding members.

3. In a printing apparatus, the combination in accordance with claim 1 in which said individual frequencies of said spectrum are applied concurrently to series circuit of said winding members.

4. In a printing apparatus, the combination in accordance with claim 1 in which means for applying a spectrum of predetermined energizing frequencies to said amplifier means includes a plurality of frequency generators, each of said generators being adapted to produce a different energizing frequency corresponding to a particular print element, and means for controlling the selective application of the various energizing frequencies of said generators to said amplifier means.

5. In a printing apparatus, the combination in accordance with claim 4 in which said control means includes switch means operable in response to read out signals from a memory device.

6. In a printing apparatus, the combination in accordance with claim 5 in which said control means further includes decoupling means operable for receiving signals from said switch means for application after decoupling to said amplifier means.

References Cited in the file of this patent

UNITED STATES PATENTS

| | | |
|---|---|---|
| 2,339,199 | Smith | Jan. 11, 1944 |
| 2,486,985 | Ruderfer | Nov. 1, 1949 |
| 2,638,567 | Cronin | May 12, 1953 |
| 2,723,386 | Camp | Nov. 8, 1955 |
| 2,811,101 | Devol | Oct. 29, 1957 |
| 2,919,171 | Epstein et al. | Dec. 29, 1959 |